July 25, 1944.  H. W. BROUGHAM  2,354,361
PRODUCTION RECORDER
Filed May 17, 1941
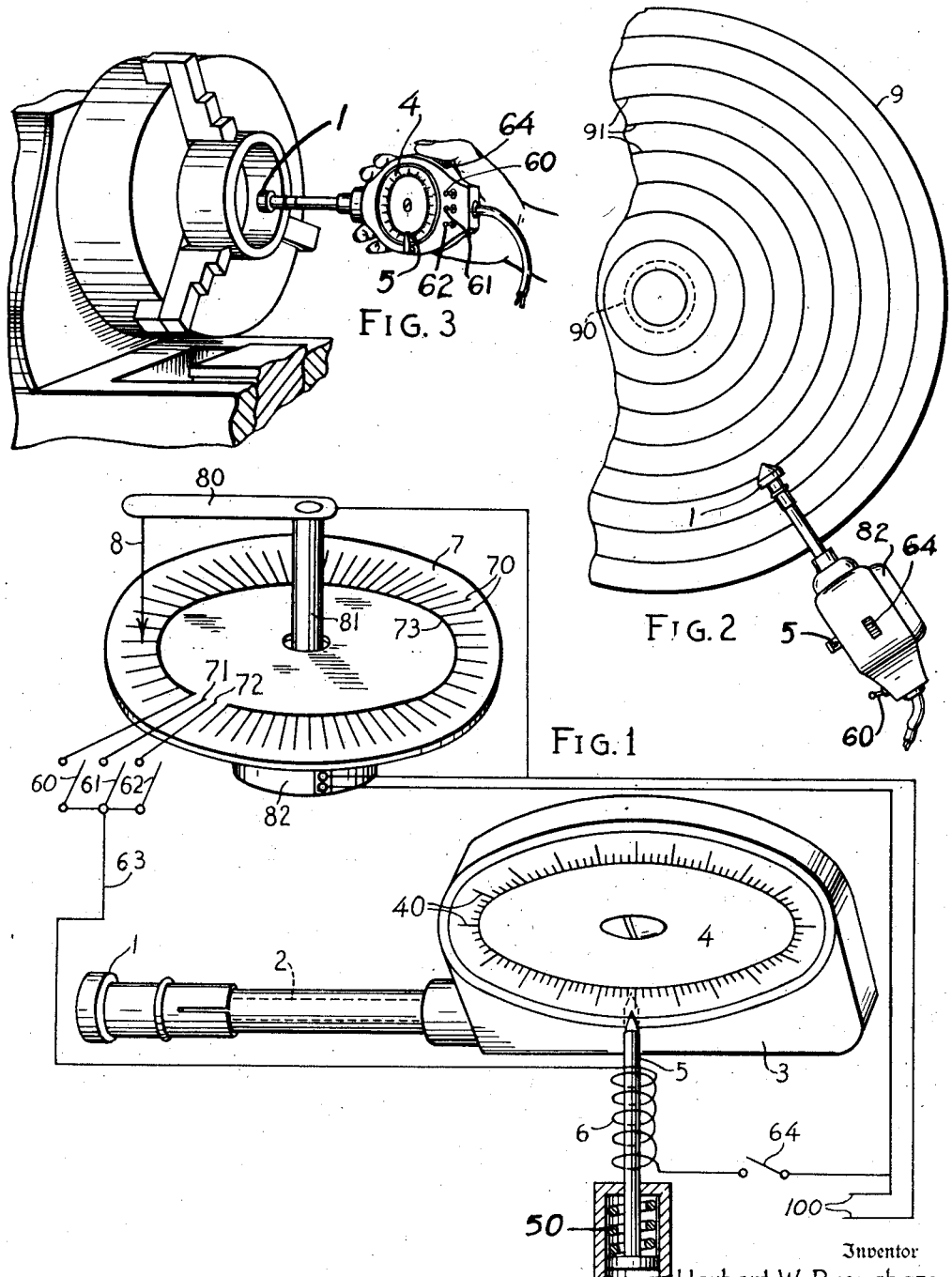
Inventor
Herbert W. Brougham
By Reynolds + Beach
Attorneys Patented July 25, 1944

2,354,361

UNITED STATES PATENT OFFICE 2,354,361

PRODUCTION RECORDER

Herbert W. Brougham, Seattle, Wash.

Application May 17, 1941, Serial No. 394,039

6 Claims. (Cl. 234—29.5)

A skilled machine tool operator generally knows by experience approximately how fast it is safe to cut with his tool, but almost never can even the most highly skilled operator be sure that he is cutting at the highest feasible rate, for the metal, for the size of the piece being worked, and for the character of the tool itself. He may be able, after trying different speeds or after time-consuming calculations, to set his machine for the best or optimum speed, but usually he comprises and plays safe by running somewhat under the optimum speed.

For maximum production it is essential that the work be done at the most rapid rate consistent with good workmanship and the preservation of the life of the tool (and the latter is usually controlling), yet, as noted above, it is possible to operate the machine at a materially slower rate, to the detriment of production schedules. Many reasonably skilled operators, and usually all relatively unskilled operators, will operate at a slower rate, perhaps from lack of familiarity with the work, perhaps in order to be sure of avoiding damage to the tool or to the work, but principally because they have no means of knowing precisely at what linear rate the cut is being made, nor what that linear rate should be. It is this linear rate which governs, and unless the operator knows the linear rate at which the material is being removed, and the optimum rate for the tool being used and for the material being worked, he will generally play safe and operate at a speed which is materially slower than the optimum. Production is thereby retarded, and this becomes a serious drawback at a time when all means are being strained to increase the rate of production, and highly skilled operators are scarce.

Some operators may refer to or be familiar with charts which indicate to them the proper or optimum linear rate of relative movement of the tool and the work, for the material being worked, but these charts are usually expressed in units of feet per minute. There are speed indicators available, which will measure with fair approximation the speed of rotation of a shaft, or the speed of such a tool, or of the work, but practical difficulties arise in applying and using the information thus obtainable, and, indeed, even in obtaining the information in usable form. If the rotary speed (R. P. M.) of a shaft is measured, the peripheral speed of the shaft is a function of its diameter, and must be calculated mathematically or obtained from charts. If the work is of a different diameter, or if it rotates at a different rate, these factors have to be taken into consideration in determining the linear speed at which metal is removed. These calculations take too much time to permit their use normally, and few machinists are capable of making such calculations. In all cases an expensive stop watch must be employed in conjunction with the measurement of the linear or rotative speed, and this is scarcely practicable under most circumstances, for the machinist is not ordinarily provided with a stop watch, nor is his foreman so provided. Neither is this arrangement entirely accurate, for the machinist must at the same time determine the number of revolutions or the distance traveled, as indicated by the speed indicator, and the number of seconds on the stop watch. His reflex actions may be faster or slower than another man's, which introduces a factor of error. It follows that while it is theoretically possible to determine the speed of the work and to set the machine tool at the best operating speed, due to practical considerations, such as the loss of time, the disinclination or inability of the workman to make such calculations, and the chances for error, this is seldom done.

It is an object of this invention to provide a single means, preferably in the form of a portable device which can be employed by the machinist, and by his foreman, for ready application to the work or to a try-board, to determine automatically and instantaneously, and to mark for reading after the test is completed, not merely the speed but also the variation in speed, that is, the linear distance traveled by the tool relative to the work, or vice versa, in a given short time interval. In this manner every operator can be sure, without trying and without calculations, and in a few seconds, rather than minutes, that his machine is always set from the first, at the optimum speed.

It is also an object to provide such a device which is capable of being used to determine and to indicate different time intervals and the rate of travel during such different time intervals, to the end that the machine is sufficiently flexible for use under all circumstances.

It is to be emphasized that it is an object to provide a device of the character indicated, which will give a positive mark or indication at the start of a test, which will give a second mark or further marks at timed intervals during the test, and which will place these marks upon a member which moves in accordance with distance traveled at the cutting point, and whatever the style of tool, to the end that by coordinating thus upon one marked indicator the distance traveled and the time intervals, the linear speed of the tool can be precisely and directly read off the device.

It is also an object to provide a device of the character indicated which may be applied to the work or to a try-board member which moves at a rate which is a function of the rate of movement of the work, so that the recording device may first build up to a speed which is equivalent to the speed of the work, and which may be caused to register the time intervals only after having been thus brought up to speed.

With these and other objects in mind, as will appear hereafter, my invention comprises the novel parts, and the novel combination and arrangement thereof, as shown diagrammatically in the accompanying drawing, and as will be more fully explained in the following specification. The novel features of my invention will be defined in the claims which terminate this specification.

My invention is shown in the accompanying drawing in a form which is intended only as diagrammatical, and not as illustrating a preferred or even a commercially practicable form of the device, and it is understood that the device in a commercial form would differ materially from that form which has been adopted for clearest illustration of the principles of the invention, and as is shown in the accompanying drawing.

Figure 1 is a combined electrical and mechanical diagram of the principles of the invention.

Figure 2 is a perspective view illustrating one manner of using the invention.

Figure 3 is an axonometric view of a further manner of using the invention.

A roller 1, which may take various forms, and such as is common in speed indicators of a similar nature, is intended for application to the work itself, as shown in Figure 3, or to a surface which moves at the same rate as the work; for instance, a circular disk 9 having a hub 90 for application to the rear end of a lathe shaft, milling machine, or any revolving machine spindle, and bearing successive rings 91 of different diameters. The roller 1, then, is of a known peripheral size, and when applied to a ring 91 which corresponds to the diameter of the work the roller 1 rotates with its spindle 2 at a speed which is proportional to the linear speed of the material being machined relative to the tool. As with the known speed indicators, the roller 1 might be applied to a test plug in the drill spindle, if the work is in a drill press, or to the ram of a shaper, or to any sort of try-board. It is entirely possible to have the peripheral extent of the roller 1 and the diameter of the rings 91 so proportioned that the roller would turn, not at the identical speed of the work, but at a speed which is a function of the work's speed.

In any event the spindle 2 and roller 1 rotate at a known speed, which is translated through gearing within the casing 3, in known manner, into rotary or other movement of a wheel 4, bearing index markings 40, which rotary movement of the wheel 4 is a function of the speed of the work past the tool, or vice versa. This in effect is no more than the known speed indicator, almost any form of which would be suitable, except that there would usually be no need of a fixed index cooperating with the markings 40.

Cooperating with the wheel 4 is a marker 5. It is immaterial whether it be an ink marker, marking directly upon the metal, a pencil or crayon marker, or one which indents a softer replaceable material. It is preferred that this marker be normally out of contact with the wheel, being held retracted by the spring 50, but being arranged for movement into contact with the wheel 4 in the vicinity of the index marks 40, or into contact with a marked disk carried by and rotative with the wheel 4, by a device which is energized at timed intervals.

Conveniently such time controlled means may take the form of a solenoid 6 which is in circuit with the segments 70, 71, and 72 of a fixed commutator disk 7, and also with a rotary contact element or brush 8 carried upon an arm 80 upon a shaft 81 of a clock mechanism 82. The clock mechanism 82 may conveniently be a synchronous motor connected to the terminals 100 that supply power to the solenoid 6. Obviously, the commutator disk might rotate and the brush 8 would then be stationary. The segments 70 of the commutator are connected all in common by the lead 73. There are preferably fifty-eight such segments 70, and the segments 71 and 72, which are individual segments, not connected to the fifty-eight others, are spaced with the fifty-eight others to provide sixty equally spaced impulses, in which case the wiper 8 is arranged to rotate once each minute, and to close the solenoid circuit once each second. A different time interval may, of course, be employed if desired.

The switches 60, 61, and 62 are all connected to the common line 63, but each one may be individually opened or closed. If all are closed, and if the master switch 64 is likewise closed, the marker 5 will be moved into contact with the wheel 4 once each second. If the switch 60 is open and only the switches 61 and 62 are closed, there will be two marks placed by the marker 5 upon the wheel 4, spaced apart by a one-second interval, but no more marks will appear throughout the minute. This gives one precise indication, of one second spacing, upon the wheel 4. If only the switch 61 or only the switch 62 is closed there will be only one mark each minute, which may be desirable in certain instances, particularly at very high speeds, such as 10,000 R. P. M.

It is believed it will be evident how the roller 1 may be applied either to the work itself, to the tool, to a moving part of the machine, or to an element such as the disk 9 which moves at a speed which is in accordance with the speed of movement of the work or the machine, and how by closing at the proper time the master switch 64 and the proper switches 60, 61 or 62 as desired or selected, the wheel 4 will rotate at an angular speed which is a function of the speed of movement of the work or of the tool past the work, and the marker 5 will be caused to mark upon the wheel 4 at precisely timed intervals. By the combination of a linear speed in a given time interval, thus marked, to be read after the marking is completed, it is possible to check directly upon the work, and to determine, usually in a few seconds, whether or not the work is being done at the optimum speed for the conditions obtaining. Indeed, when machinists are provided with such indicators, it will be possible to mark upon his blueprints or specifications the machine speed at which each part of the work is to be done, and it will then be possible for the foreman to check the work, as it is being done, with the blueprints. The machinist then has no excuse for failing to run his machine at the indicated speed, and regardless of his skill or experience production rates will not materially lag.

For some operations, as for instance in spinning, it is the rate of rotation, rather than the linear speed, which is important, and while known speed indicators will approximately determine the rate of rotation, it has not been conveniently possible before to determine it precisely, nor to provide definitely marked starting and stopping points for later measurement of the speed of rotation, such as is afforded by this tool. It is to be understood, then, that where reference is made to determination or indication of the distance traveled, primarily distance is measured in linear units, such as inches per second or feet per minute, but it is not intended to exclude, for certain special cases, measurement in angular units.

The essential novelty in the present invention consists in the provision of a simple, portable, relatively inexpensive tool, for use in all kinds of machine tool work, provided within itself with means for recordation and indication in juxtaposition or upon a single surface or member, of (1) the distance traveled and (2) the time interval during which such distance was traveled, the distance being the units, whether linear or angular, traveled by a moving surface relative to a fixed tool, or vice versa.

What I claim as my invention is:

1. A speed indicating device adapted to be operated by time-keeping mechanism and by machine tool movement responsive mechanism, comprising a casing adapted to be carried in the hand of a user, a speed indicating disk supported by said casing in visible position, graduated circumferentially in units of work travel, and rotatable by such machine tool movement responsive mechanism at a rate corresponding to work travel, a marker carried by said casing in position for movement to mark on the graduated portion of said speed indicating disk, means operable by the time-keeping mechanism to move said marker into contact with said speed indicating disk while it is being thus rotated, thus to mark it at the beginning and again at the end of a predetermined time period, whereby the spacing of the marks thus produced upon the graduated portion of said speed indicating disk constitutes a measure of the operating speed of the machine tool work, and control means exteriorly of and carried by said casing, manually operable at will to initiate operation of said marker moving means, and thereafter operable to terminate operation of said marker moving means while said speed indicating disk is being thus rotated.

2. A speed indicating device adapted to be operated by time-keeping mechanism and by machine tool speed responsive mechanism, comprising a speed indicating disk graduated circumferentially in units of distance and rotatable by such machine tool speed responsive mechanism, commutator means including a ring and a brush relatively rotatable by the time-keeping mechanism, said ring having a plurality of contacts equally spaced circumferentially and connected in parallel circuit, and a further contact which is independent of such parallel circuit, electromagnetic means energizable by said commutator means, a marker movable by said electromagnetic means to mark said speed indicating disk upon energization of said electromagnetic means by said commutator means, and switch means for selectively connecting said electromagnetic means either to the parallel circuit in which said plurality of contacts are connected or to said independent commutator means ring contact for operating said marker only once during each revolution of said commutator means brush about its ring, or a plurality of times during each such revolution.

3. A speed indicating device adapted to be operated by time-keeping mechanism and by machine tool speed responsive mechanism, comprising a speed indicating disk graduated circumferentially in units of distance and rotatable by such machine tool speed responsive mechanism, commutator means including a ring and a brush relatively rotatable by the time-keeping mechanism once each minute, said ring having sixty contacts equally spaced circumferentially, fifty-eight successive contacts thereof being connected in parallel circuit, and the other two contacts being independent of each other and of such parallel circuit, electromagnetic means energizable by said commutator means, a marker movable by said electromagnetic means to mark said speed indicating disk upon energization of said electromagnetic means by said commutator means, and switch means for selectively connecting said electromagnetic means either only to one of said independent contacts to effect movement of said marker once each minute, or simultaneously to both of said independent contacts to effect movement of said marker twice each minute at an interval of one second, or simultaneously to both of said independent contacts and to said parallel circuit in which said fifty-eight successive contacts are connected to effect movement of said marker once each second.

4. A speed indicating device, comprising a casing adapted to be carried in the hand of a user and open at one side, a speed indicator dial rotatively mounted in said casing's open side, and bearing a plurality of angularly spaced travel marks, a rotative spindle projecting from and journaled in the casing, and bearing a contact roller operable to rotate said spindle by contact of the roller with the element the speed of which is to be measured, an operative connection within the casing between said spindle and said speed indicator dial for rotating such dial at a speed coordinated with that of said spindle and its roller, clock mechanism within the casing, a marker carried by said casing adjacent to the periphery of said speed indicator dial, and reciprocable to make a mark upon such dial in a position related to the travel marks thereon, means electrically energizable and operatively connected to reciprocate said marker upon energization, commutator means driven by said clock mechanism and adapted to be electrically connected to energize said marker moving means periodically during such rotation of the roller, whereby the travel marks between successive marker marks on the dial constitute a measure of the speed of such element, and a control switch carried by said casing, and manually operable at will to complete the electrical connection between said commutator means and said marker reciprocating means for energization thereof by said commutator means, and thereafter operable to sever the electrical connection between said commutator means and said marker reciprocating means to prevent energization thereof by said commutator means, while said speed indicating dial is being thus rotated.

5. A speed indicating device adapted to be operated by time-keeping mechanism and by machine tool spaced responsive mechanism, comprising a speed indicating member movable by one such mechanism, commutator means, including a ring and brush relatively rotatable by the other such mechanism, and a marker energizable by said commutator means, and selectively operable to mark said speed indicating member upon such energization either once or a plurality of times during each revolution of said brush about said ring.

6. A speed indicating device adapted to be operated by time-keeping mechanism and by machine tool speed responsive mechanism, comprising a speed indicating member movable by one such mechanism, commutator means, including a ring and brush relatively rotatable by the other such mechanism, a marker energizable by said commutator means, and operable to mark said speed indicating member upon such energization, and selector means operable to effect energization of said marker by said commutator means, either once only during each complete relative rotation of said commutator ring and brush, or twice only during each such rotation once upon initiation and again upon completion of the travel of said brush over a predetermined arc of said commutator ring, or successively upon completion of the travel of said brush over successive equal arcs of said commutator ring during each revolution thereof.

HERBERT W. BROUGHAM.

CERTIFICATE OF CORRECTION.

Patent No. 2,354,361.　　　　　　　　　　　　　　　　July 25, 1944.

HERBERT W. BROUGHAM.

It is hereby certified that error appears in the printed specification of the above numbered patent requiring correction as follows: Page 3, second column, line 75, claim 5, for the word "spaced" read --speed--; and that the said Letters Patent should be read with this correction therein that the same may conform to the record of the case in the Patent Office.

Signed and sealed this 26th day of September, A. D. 1944.

Leslie Frazer (Seal)　　　　　　　　　　　　　Acting Commissioner of Patents.